US008656499B1

(12) United States Patent
Bertz et al.

(10) Patent No.: US 8,656,499 B1
(45) Date of Patent: Feb. 18, 2014

(54) CLIENT-SIDE BIT-STRIPPING SYSTEM AND METHOD

(75) Inventors: Lyle Bertz, Lee's Summit, MO (US); Fred Rogers, Olathe, KS (US); Jason Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1275 days.

(21) Appl. No.: 12/049,053

(22) Filed: Mar. 14, 2008

(51) Int. Cl.
*H04N 7/167* (2011.01)

(52) U.S. Cl.
USPC ........ 726/26; 726/3; 726/27; 726/33; 725/31; 348/156

(58) Field of Classification Search
USPC .......... 726/3, 26, 27, 33; 725/31, 38; 348/156
See application file for complete search history.

(56) References Cited

U.S. PATENT DOCUMENTS

| | | | | |
|---|---|---|---|---|
| 6,816,596 | B1* | 11/2004 | Peinado et al. | 380/277 |
| 7,702,103 | B2* | 4/2010 | Lecomte et al. | 380/217 |
| 2002/0026636 | A1* | 2/2002 | LeComte | 725/31 |
| 2005/0213760 | A1* | 9/2005 | LeComte et al. | 380/217 |
| 2005/0286721 | A1* | 12/2005 | Lamberg | 380/270 |
| 2006/0029227 | A1* | 2/2006 | Van Der Vleuten et al. | 380/200 |
| 2006/0137028 | A1* | 6/2006 | Evans et al. | 726/29 |
| 2006/0143478 | A1* | 6/2006 | Morino et al. | 713/193 |
| 2006/0177061 | A1* | 8/2006 | Orsini et al. | 380/268 |
| 2006/0195909 | A1* | 8/2006 | Boswell et al. | 726/26 |

FOREIGN PATENT DOCUMENTS

| | | | |
|---|---|---|---|
| WO | WO 9908428 A1 * | 2/1999 | |
| WO | WO 0011871 A1 * | 3/2000 | |

OTHER PUBLICATIONS

Machine translation of WO99/08428 from Google (12 pages).*

* cited by examiner

*Primary Examiner* — Edward Zee
*Assistant Examiner* — Thomas Gyorfi

(57) ABSTRACT

Bit-stripping methods are described for protecting digital media content against illicit recording and sharing. In one such method, a client device receives the media content and performs bit stripping on the received media content, thereby creating two datasets: stripped data and recombination data. The client device then recombines the datasets to reconstitute the media content, and it plays back the media content. Preferably, the media content on the client device is not available to recording software, and either the stripped data or the recombination data is also unavailable to such software. The client device may store one of these datasets; when future playback is desired, the client device requests the other of the datasets from a server. The bit-stripping may be performed in a client-specific way to discourage sharing of datasets.

7 Claims, 4 Drawing Sheets

CLIENT-SIDE BIT-STRIPPING SYSTEM AND METHOD

BACKGROUND

The widespread ability of consumers to receive, share, and play back media content over computer networks poses an enormous challenge to content providers. Without any use of encryption or other digital rights management techniques, it is, in principle, a trivial matter for a single copy of media content to be shared among innumerable users, each of whom can create a copy and, in turn, share that copy with others. Even if the first consumer has paid to access the media content, each consumer who receives a shared copy for free may be less likely to pay the content provider for a copy. Moreover, alterations of the copies are possible, such that consumers may receive adulterated content when they believe they are receiving an exact duplicate of the original content. The adulterated content may be of inferior quality, it may include inaccurate attributions of authorship or ownership, or it may even pose security risks to the consumer.

Several systems have been developed to help ensure that content providers can be adequately compensated in proportion to the use of their content, and that consumers receive trustworthy content. Such systems are referred to, in general, as digital rights management systems.

One digital rights management technique is referred to as "bit stripping." In bit stripping, a content server removes a portion of the information from a media content file. The removed information is stored in a "recombination file," and the remaining information is stored in a "stripped file." In general, the recombination file might be around 1%-2% of the size of the stripped file. The selection of data that is stripped from the media file may be different for each authorized recipient of the file. In this way, the recombination file is a sort of "key," unique to each recipient, that can be used to unlock that recipient's version of the stripped file. Such a system may be used in, for example, streaming media applications. A streaming media player may be responsible for processing the recombination file and the stripped file back into usable digital media content as that content is being played back to the user. The streaming media player does not write the recombined, usable digital content onto the recipient's hard drive, so the recipient does not obtain a copy of the content that he can freely distribute to other users.

DETAILED DESCRIPTION

I. Overview of an Exemplary Embodiment

Figure 1:
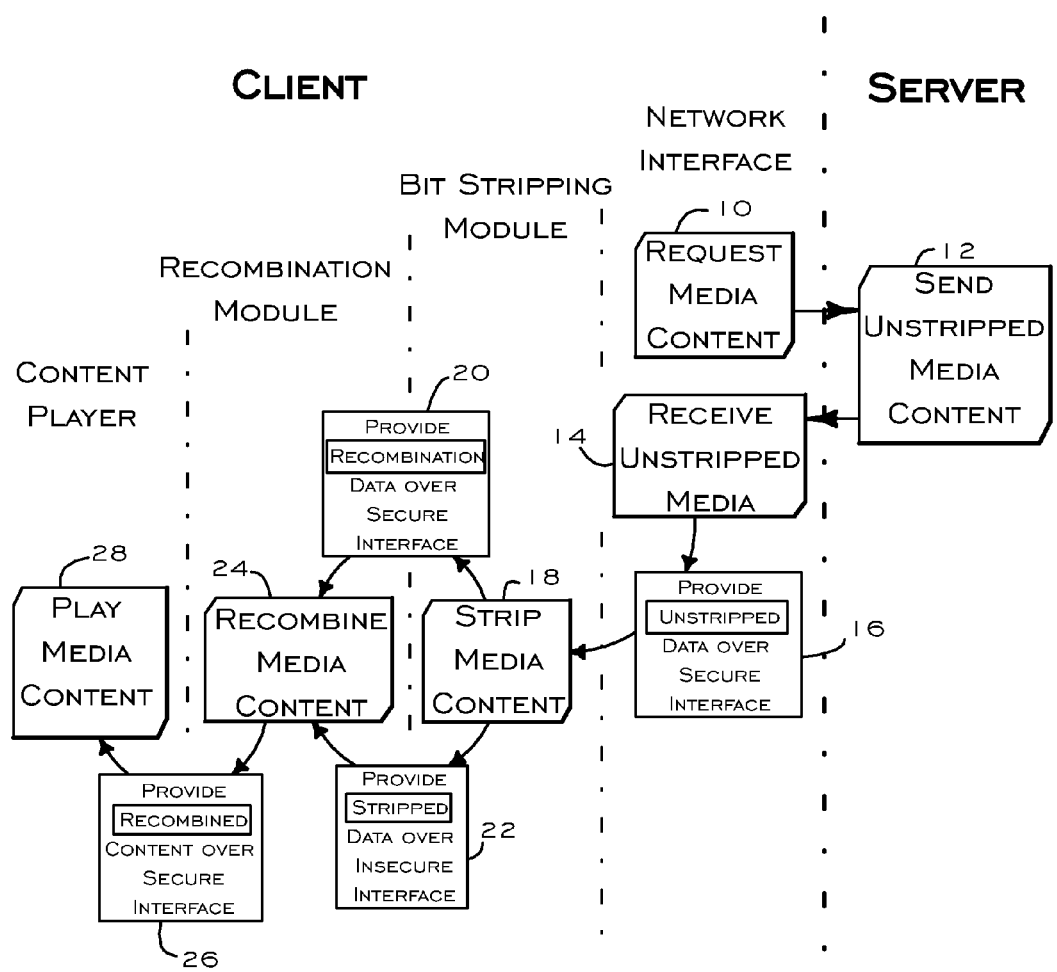
FIG. 1 is a flow diagram illustrating steps performed by a server and by a client in an exemplary embodiment of a bit-stripping and recombination method as described herein.

Conventionally, bit stripping is performed only on the server side. That is, the bit stripping is performed on media content before that content is sent over a network to a client. In an exemplary embodiment of a bit-stripping system as disclosed herein, a bit-stripping operation is performed on the client side, after the media content has been delivered over the network.

In such an embodiment, a client device, such as a data-capable mobile telephone or a wireless laptop computer, includes a bit-stripping module, a recombination module, and a content player. Media content received by the client device over a network is subjected to bit stripping by the bit-stripping module before it can be archived in a storage medium of the client device. This bit-stripping module generates stripped data and recombination data. The stripped data and/or the recombination data may be stored for later use, or they may be kept only in random access memory (RAM) of the client device for immediate playback. When the user wishes to play the content, the recombination module receives the stripped data and the recombination data, and it reconstructs the media content. The content player plays back the reconstructed media content using, as appropriate, the audio and/or video functionality of the client device to play the sounds and/or images of the media content.

This embodiment is particularly useful when content is multicast or broadcast over a secure network, such as a CDMA (code division multiple access) wireless network. In this case, end-to-end content security is offered by combining the security features of the network itself with those of the client-side bit stripping described herein. Media content can be broadcast or multicast over the secure network in an un-stripped form. The same content can be provided to all recipients, but the security of the network itself makes it difficult for a user to make an unauthorized recording of the un-stripped content. At a client device of each recipient, a network interface decrypts the incoming stream as appropriate, but before that decrypted stream is made available to application programs on the client device, such as media players or "stream ripper" programs, a bit-stripping module separates the content into stripped data and recombination data. A recombination module is then used to combine the stripped data and the recombination data into data that can be played back by a media player. The recombination module may itself be a component of a media player application.

A process of bit stripping can be understood as a process of removing sufficient information from a stream, file, or other collection of content data to generate stripped data, such that the content data cannot be completely reconstructed from the stripped data alone. The content data can, however, be completely reconstructed with the use of the stripped data together with the removed data, when the removed data is made available as recombination data. The recombination data provides the information needed to reconstruct the content data from the stripped data. In some embodiments, the recombination data further specifies how that needed information is to be combined with the stripped data (e.g., it may identify where, in the stripped data, each piece of removed data should be added to reconstruct the original data). Preferably, the stripped data has a smaller size than the content data. That is, even if the content data is maximally compressed, the bit stripping process can result in stripped data consisting of fewer bits than the content data.

Stripped data its corresponding recombination data can be differentiated from encrypted data and its corresponding decryption key. In the case of encrypted data, a single decryption key is designed to be used with various instances of content data. As a result, the value of a decryption key is not dependent on the content data, and the encrypted data must contain, subject to decryption, all of the information needed to reconstruct the content data. In the case of bit stripping, the value of the recombination data is dependent on the content data, and information from both the stripped data and the recombination data is needed to reconstruct the content data.

In one embodiment of the client-side bit-stripping described herein, a seed value is used to determine what data is stripped from the content. For example, the seed value may be used as the input of a hash algorithm whose output specifies a position or positions (such as an offset) of bits in the content data from which data is stripped.

The seed value may be a random number selected independently by each client, so that the stripped data and the recombination data are likely to be different for each client. As an alternative, the seed value may be based on an identifier, such as an identifier of the client device, of its user, or of a streaming media session. The identifier may be, for instance, a MAC (media access control) identifier or a user ID. Again, the use of an identifier is likely to result in a unique set of stripped and recombination data for each client.

In one embodiment, the stripped data and the recombination data are both stored on the client device. Alternatively, one or both of the stripped data and the recombination data is stored at a server remote from the client device. In embodiments in which a seed value can be used to identify the data to be stripped, the stripped data and/or the recombination data may be regenerated by an entity (such as the client device or the serer) that has access to the unstripped media content and that stores or otherwise learns the seed value. It is contemplated that for content files with a size of around 3 megabytes, which approximates the size of many MP3 files, the recombination file may have a size of a few hundred kilobytes. Each of these recombination files can be stored on a network server for each user.

In one example, the client device stores the recombination data but not the stripped data. To play the media content, the client sends to the server a request for the stripped data. Using information sent by the client device (this information may be the seed data itself, or other information from which the seed data can be derived), the server reproduces the stripping of the media content and sends the stripped data to the client device. The client device recombines the received stripped data with the stored recombination data to generate data usable by a media player.

In another example, the client stores neither the recombination data nor the stripped data. In such an instance, in response to a client request, the server may send both the stripped data and the recombination data, or it may send the unstripped media content to be stripped at the client device.

II. A Client-Side Bit Stripping Method

A method of performing client-side bit stripping is illustrated in FIG. 1. FIG. 1 illustrates steps performed by a client device as well as steps performed by a server system of one or more networked servers.

In step 10, a client device sends to the server a request for media content. In step 12, the server responds by sending the requested media content in an unstripped format. In step 14, a network interface of the client device receives the unstripped media content. The media content may be sent as a stream, in which case the sending and receiving of media content, and possibly the subsequent processing steps, may take place continually while the subsequently-described steps are being performed.

Preferably, the media content, while it is in its unstripped form, is not accessible to untrusted applications on the client device, such as stream-ripper applications, file-sharing applications, browser applications, or content player applications, to name a few. In some embodiments, the system may differentiate between streams that are subject to client-side bit stripping and streams that are not subject to client-side bit stripping. Streams that are not subject to client-side bit stripping may be made available to content player and/or other applications, while those that are subject to client-side bit stripping may be prevented from being accessed by untrusted applications. Differentiating between streams that are or are not subjected to bit stripping may be performed by any of a variety of techniques, such as monitoring for the presence of a flag or other communication from the server that identifies content that should be subjected to client-side bit stripping.

In order to make media content on the client device inaccessible to untrusted applications on the client device, the unstripped media content is preferably provided to a client-side bit stripping module over a secure interface in step 16. A secure interface may be implemented in various ways that offer different levels of security. For example, in a client device that implements principles of trusted computing, the network interface of the client device may send unstripped data only to a trusted application. In another example, particularly where the network interface and bit stripping module are implemented in digital circuitry, the circuitry may be designed such that unstripped media content is sent over a data bus to the bit stripping module.

It should be noted that a secure interface need not be completely secure. Using the first example, it is not necessary for a secure interface to withstand decryption attempts designed to defeat a trusted computing scheme. Using the second example, it is not necessary to make it impossible for an individual to monitor voltages on the data bus. Rather, a secure interface as contemplated herein is one whose level of security is reasonable in light of the nature of the media content. For example, a secure interface used in the receipt of streaming music files is preferably one that is not defeated by the installation of simple, lawful stream-ripper software. Such an interface may use encryption or even simple obfuscation to counter casual attempts at recording an unprotected media stream.

In step 18, the bit stripping module performs the bit stripping function on the media content, thereby generating at least two sets of data: stripped data and recombination data. As described above, the bit stripping technique preferably differs for different client devices, and information identifying the client device (or its user) can be used as a seed value to specify how the bit stripping is performed. In an exemplary embodiment, the client device is capable of storing the stripped data in the form of a stripped file on a file system of the client device. In this way, a user of the client device can backup, delete, or otherwise manage the stripped file. In such an embodiment, the client device may be able to transfer the stripped file to another client device, but without the recombination data, the stripped file is likely to be useless to that other client device. In this exemplary embodiment, the recombination data is kept relatively secure. If the recombination data is stored as a recombination file, access to that file is preferably restricted, such that the client device cannot easily transfer the recombination data to another client device.

In one alternative embodiment, the stripped data is kept in a secure format, while the recombination data is not. Some embodiments may keep both kinds of data in a secure format.

In step 24, a recombination module of the client device receives recombination data that is provided (in step 20) over a secure interface and stripped data that is provided (in step 22) over an insecure interface, and the recombination module operates to reconstruct the media content. The reconstructed media content is provided in a secure way in step 26 to a content player, and in step 28, the content player plays the media content.

The secure interfaces used in steps 26 and 20 preferably have the characteristics described above with respect to step 16.

In one alternative embodiment, the stripped data is kept in a secure format, while the recombination data is not. Some embodiments may keep both kinds of data in a secure format. Preferably, data that is handled using secure interfaces is discarded once it is used, rather than being stored for later re-use. Thus in the example of FIG. 1, the recombination data is discarded (e.g., it is dereferenced and/or caused or allowed to be erased or overwritten) after the media content is reconstructed, and the reconstructed media content is discarded after it is played back.

The procedure for bit stripping may itself be different for different client devices (e.g., the specific procedure used may depend on information identifying or otherwise associated with the client device). As a result, some operable embodiments may not secure either the recombination data or the stripped data, and the difficulty of reconstructing the specific procedure for recombining the data can be used to provide the appropriate level of security.

Figure 2:
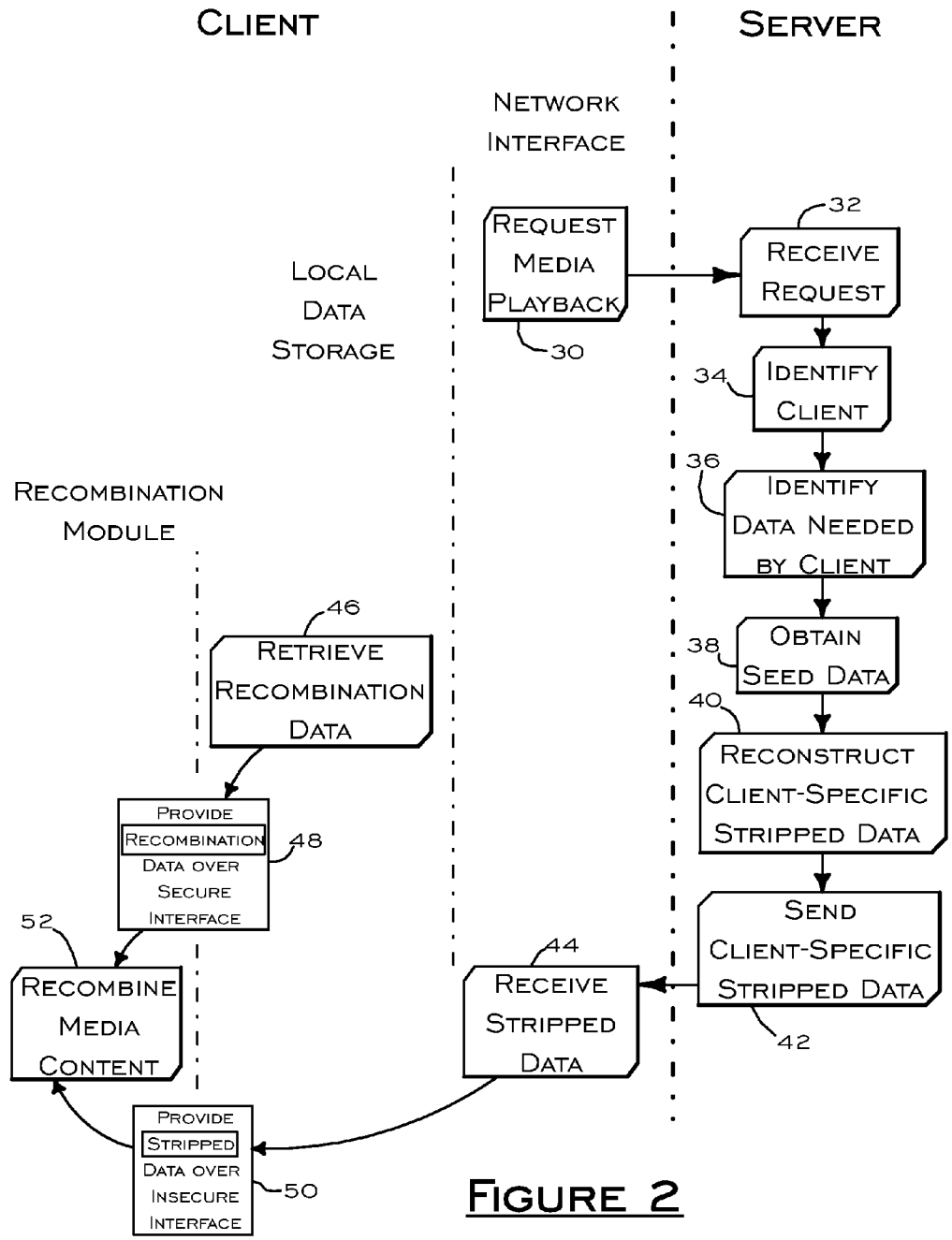
FIG. 2 is a flow diagram illustrating steps performed by a server and by a client in an exemplary embodiment of another bit-stripping and recombination method as described herein.

Because the client device may retain the recombination data and/or the stripped data in storage, the client device need not obtain the entirety of unstripped media content for subsequent playbacks. FIG. 2 illustrates a method wherein the client device has retained the recombination data in local storage but must receive the corresponding stripped data from the server system. (A alternative method in which the client retains the stripped data but requires the recombination data is also contemplated; however, because its operation is analogous to that of FIG. 2, this alternative method is not separately illustrated.)

In step 30, the client requests playback of the media content. The server system receives this request in step 32 and processes the request to identify the client in step 34. Based on the identity of the client, the server system can consult a data storage system referred to as a user vault to determine in step 36 what data, if any, the client device needs to effect playback. The user vault may also contain licensing and/or usage information, such as information on whether the client device is authorized to play back the content at all, or how many times the client device has played back the particular content (possibly for billing purposes).

Preferably, the bit stripping process is unique for each client device, so, in step 38, the server system collects the seed data it needs to specify the bit stripping process. This seed data may be data, such as a client device or user identifier, sent in the request (of step 30) for media playback, or the server may conduct additional communications (not illustrated) with the client device to acquire the seed data. Based on the seed data, the server processes the original media content to reconstruct the stripped data specific to that client device.

In step 42, the client device sends the stripped data to the client device. The client device retrieves the recombination data kept in local data storage (step 46) and receives the stripped data from the server (step 44). In accordance with one embodiment, the recombination data is provided to the recombination module over a secure interface (step 48) and the stripped data is provided over an insecure interface (step 50), but, as described above, other arrangements are contemplated. In step 52, the recombination module recombines the stripped and recombination data to reconstruct the media content. This reconstructed content may then be played back on the client device (as illustrated in steps 28 and 28 of FIG. 1).

In an exemplary embodiment, the bit stripping process preferentially removes information such as framing information from a media stream, in addition to bearer data. This framing information often comprises approximately 3% of a media file. Overall, the bit stripping process preferably removes more than 1% but less than 50% of the original content.

The various processes described herein may be performed sequentially, simultaneously, or in an interleaved manner (if, for example, the processes are sharing the resources of a single general-purpose processor executing multiple threads). Thus, where one process is described as taking place before another process, the description should be understood to refer to the direction of the overall flow of data; that is, the "later" process is downstream of the "earlier" process, even if the two are being performed—on different portions of a stream of data—at the same time.

Figure 3:
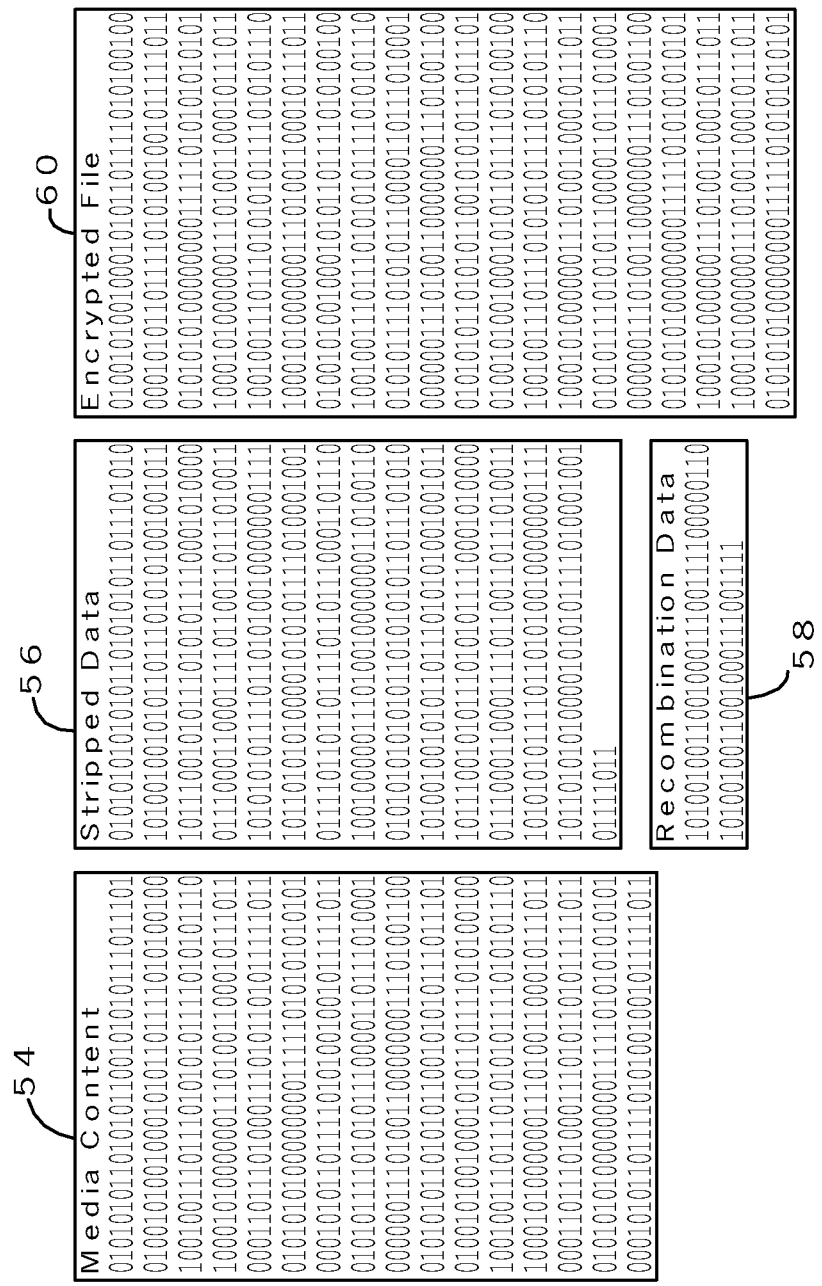
FIG. 3 schematically illustrates, for purposes of comparison, digital media content, stripped data, recombination data, and encrypted data.

A process of bit stripping should not be confused with encryption. A schematic example of three digital data sets is illustrated in FIG. 3. Data set 54 represents original unstripped, unencrypted digital media content. Data set 56 represents the stripped data that results from subjecting the original data 54 to a bit stripping process, and data set 58 represents the corresponding recombination data. In the example of FIG. 3, the bit stripping is illustratively performed by removing every 9th bit of the original data 54. The stripped data 56, then, can be made smaller than the original data 54. In general, the sizes of the stripped data 56 and the recombination data 58 sum up to approximately the size of the media content 54, although it can be expected that, due to bit padding, duplication of header information, and other overhead, the sum of the two in practice is likely to exceed the size of the original content 54. For example, the recombination data may also include the seed data or other information used to identify the bit stripping technique used.

In contrast, a data set 60 schematically represents the result of encrypting the media content 54. Unless compression techniques are used on the original content 54, the encrypted data 60 will necessarily be at least as large as the original content 54. In general, due to bit padding and header information, an encrypted file is expected to be larger than the original content 54, even before the size of the encryption key is taken into consideration. It should be understood, however, that the data resulting from bit stripping can then be encrypted, and conversely, data that has been encrypted can then be subjected to bit stripping. In such instances, the processes of recombination and decryption should be performed in the reverse order of that in which the bit stripping and the encryption were performed.

III. A Client-Side Bit Stripping System

Figure 4:
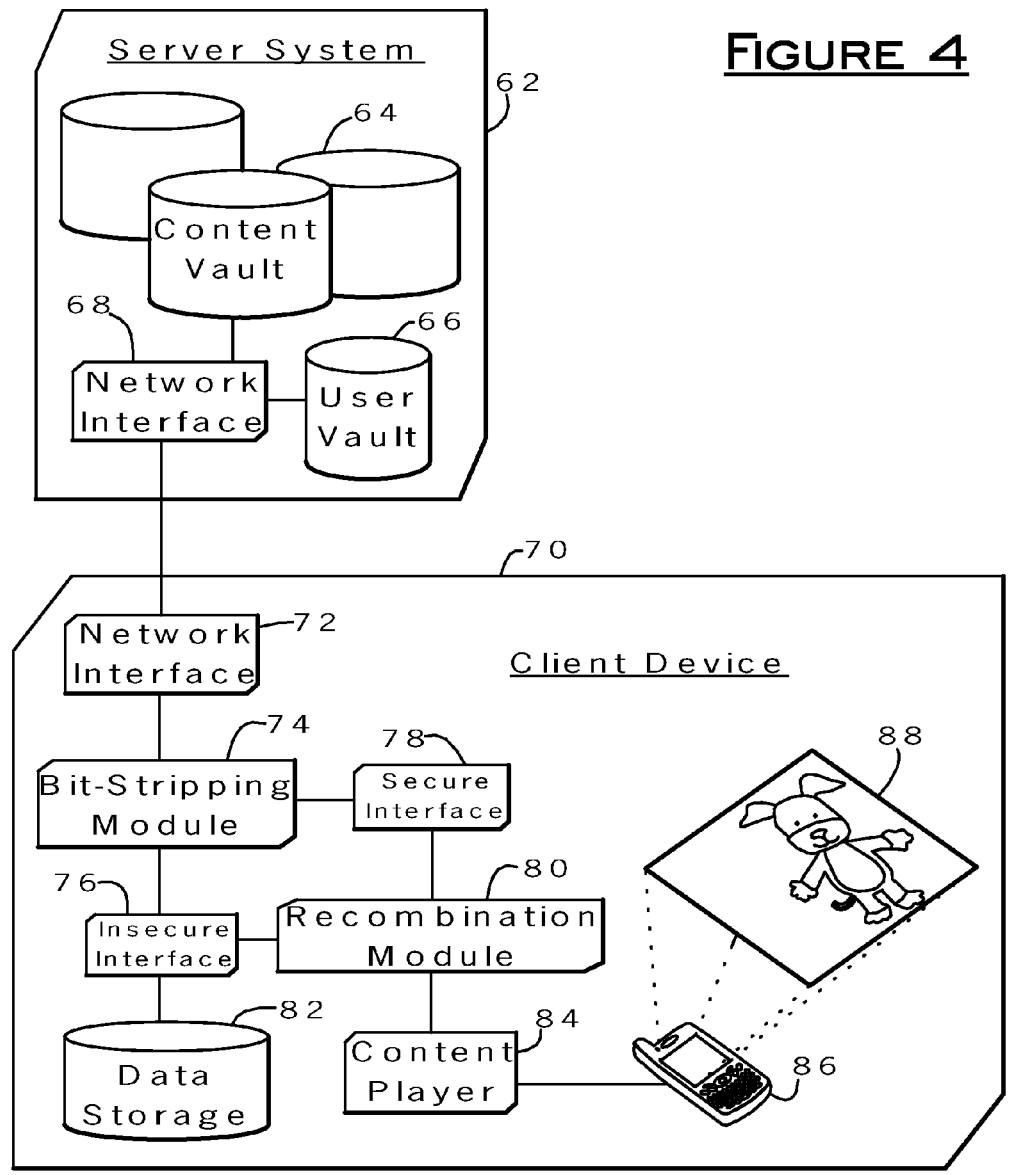
FIG. 4 is a schematic block diagram illustrating the functional architecture of a server system and of a client device in a system of client-side bit stripping.

FIG. 4 schematically illustrates one possible system that enables client-side bit stripping. In a preferred embodiment, the components illustrated in FIG. 4 perform at least the functions described in Section II, above.

The system of FIG. 4 includes a server system 62, made up of one or more networked servers, and a client device 70. It is to be understood that embodiments of the system of FIG. 4 are expected to be implemented with more than one server system and a large plurality of client devices, though only one of each is illustrated in FIG. 4 for the sake of clarity.

The server system 62 includes a content vault 64 that stores media content to be sent to the client device 70, although in the case of, for example, a live broadcast or multicast, the content vault 64 may not be necessary. Content from the content vault 64 or elsewhere is sent to client devices over a network interface 68 of the server system 62. The network interface 68 is also available to receive and respond to client devices' requests for content. A user vault 66 is provided to store information as to what information may be provided to a client device. The user vault 66 may also store information on what bit-stripping technique is associated with each client. In some embodiments, the client device 70, after performing its client-side bit stripping, uploads the recombination data to the server system 62, preferably using a secure technique such as URLAUTH, for storage in the user vault 66.

At the client device 70, a network interface 72 is provided to receive media data from the server system 62 and to handle messaging between the server system 62 and the client device 70. A bit stripping module 74 of the client device takes media content as its input and gives, as its output, stripped data and recombination data. A recombination module 80 is provided to recombine stripped data and recombination data into playable media. A content player application 84 uses the input of playable media data to drive a user interface 86 of the client device to display (usually through audio and/or video means) the represented content 88.

In some embodiments, the stripped data and/or the recombination data is stored locally on the client device in data storage 82. The client device 70 has one or more interfaces, such as an insecure interface 76 and a secure interface 78. The insecure interface 76 may make use of ordinary file system and software interfaces that do not inhibit the recording, sharing or transfer of data. The secure interface 78 may include a trusted computing interface between software applications, it may be a hard-wired interface in the circuitry of the client device, or it may make use of various levels of encryption, to name a few examples. To prevent casual file sharing, the level of encryption need not be extraordinary. For example, a bit stripping module 74 and a recombination module 80 may share data in an encrypted format, but the encryption and/or decryption keys may be soft-coded into those modules, such that a dedicated hacker could retrieve them from the object code of the modules or from main memory during execution of the modules. Such an interface is still contemplated to be secure within the bounds of the present disclosure. As another example, the bit stripping module 74, the recombination module 80, and/or the content player 84 may operate as a single software program, making data sufficiently secure to prevent casual file sharing but not necessarily blocking the efforts of a dedicated individual able to monitor the contents of main memory. Similarly, a secure interface as described herein does not necessarily prevent a technically savvy user from attempting to duplicate the contents of a buffer used by the content player.

The components illustrated in FIG. 4 and described elsewhere in the present disclosure are preferably implemented by a combination of hardware and software. For example, the network interfaces 68 and 72 may include a network card together with driver software and application-layer software to manage communications protocols. It should be understood that the communication between the two network interfaces 68 and 72 can take place as a direct connection or over intermediate network components, such as the Internet, a local area network, or a wireless telecommunication service provider network. The storage components 64, 66, and 82 may include magnetic, optical, and/or microchip-based storage media, together with software for reading and writing thereon, which may include database software. The bit-stripping module 74 and recombination module 80 may be implemented through the use of a data storage medium that stores instructions that are executable on a general-purpose processor (not shown) of the client device 70 to perform the above-described functions of those modules. Alternatively, one or both of those modules may be implemented in special-purpose circuitry. The content player 84 may be implemented entirely through the use of a general-purpose processor executing stored instructions, or all or part of its functionality can be implemented through special-purpose circuitry, such as an MP3 decoder microchip.

The scope of the invention is defined by the following claims, the scope of which should not be limited to the particular features of the embodiments described above.

The invention claimed is:

1. A bit-stripping method, comprising:
receiving media content at a client device having a media content player, wherein the media content is subject to a bit stripping module of the client device, and wherein the media content is provided to the bit stripping module via a first secure interface such that the media content is inaccessible by the media content player;
operating the bit stripping module of the client device to remove bits at predetermined positions throughout the received media content to create stripped data and recombination data, wherein the stripped data is information of the received media content remaining after the removal of the bits and the recombination data is a collection of the removed bits, wherein the recombination data comprises a portion of framing information and bearer data removed from the media content such that the stripped data alone is insufficient for playback by the media content player;
providing the recombination data over a second secure interface to a recombination module of the client device;
operating the recombination module of the client device to recombine the stripped data and the recombination data to create recombined media content;
discarding the stripped data after the recombination operation;
providing the recombined media content over a third secure interface to the media content player;
operating the media content player to play back the recombined media content;
discarding the recombined media content after the playback operation;
storing the recombination data on the client device;
after storing the recombination data on the client device, requesting the media content from a server;
receiving, from the server, the stripped data associated with the recombination data; and
operating the client device to recombine the stored recombination data and the received stripped data.

2. A method according to claim 1, wherein:
the bit stripping module identifies the bits for removal from the received media content;
creating the stripped data includes removing the identified bits from the received media content; and
creating the recombination data includes collecting the removed bits.

3. A method according to claim 2, further comprising:
obtaining seed data associated with the client device, wherein
the identification of bits for removal is based at least in part on the seed data.

4. A method according to claim 1, wherein the stripped data is smaller than the received media content.

5. A method according to claim 1, wherein the recombination data further comprises information identifying where, in the stripped data, each portion of information is configured to be added to reconstruct the media content.

6. A method of operating a server in a client-side bit stripping system, comprising:

receiving from a client device a request for stripped data in order to playback media content, wherein the stripped data corresponds to an instance of recombination data stored on the client device that comprises information to reconstruct the media content from the stripped data; and in response to the request:

retrieving the media content from a content vault;

identifying the client device;

based on the client device, identifying information associated with a bit stripping technique specific to the client device used to create the stripped data corresponding to the instance of recombination data stored on the client device;

operating the server to perform the bit stripping technique on the media content generating the stripped data and another instance of the recombination data associated with the media content, wherein the bit stripping technique removes bits at predetermined positions throughout the media content to create the stripped data and the another instance of the recombination data, wherein the stripped data is information of the media content remaining after the removal of the bits and the another instance of the recombination data is a collection of the removed bits, wherein the another instance of the recombination data comprises a portion of framing information and bearer data removed from the media content such that the stripped data alone is insufficient for playback by a media content player, wherein the bit stripping technique comprises obtaining seed data associated with the client device and identifying bits for removal from the retrieved media content based at least in part on the seed data; and sending to the client device the stripped data associated with the media content, without sending the another instance of recombination data to the client device.

7. A client device comprising:

a network interface operative to receive digital media content;

a bit stripping module operative to receive the digital media content from the network interface and to generate stripped data and recombination data from the digital media content, wherein the bit stripping operation removes bits at predetermined positions throughout the digital media content to create the stripped data and the recombination data, wherein the stripped data is information of the digital media content remaining after the removal of bits and the recombination data is a collection of the removed bits, wherein the recombination data comprises a portion of framing information and bearer data removed from the media content such that stripped data alone is insufficient for playback by a content player;

a first secure interface between the network interface and the bit stripping module, the first secure interface being operative to convey the digital media content between the network interface and the bit stripping module;

a recombination module operative to recombine the stripped data and the recombination data to create recombined media content;

a second secure interface between the bit stripping module and the recombination module, the second secure interface being operative to convey at least one of the stripped data and the recombination data to the recombination module;

the content player operative to play the recombined media content; and a data storage, wherein the client device is operative to store at least one of the stripped data and the recombination data in the data storage, and wherein the client device is operative to discard the other one of the stripped data and the recombination data.

\* \* \* \* \*